US012634260B2

(12) United States Patent
Parla et al.

(10) Patent No.: US 12,634,260 B2
(45) Date of Patent: May 19, 2026

(54) OPTIMAL DATA PLANE SECURITY AND CONNECTIVITY FOR SECURED CONNECTIONS

(71) Applicant: Cisco Technology, Inc., San Jose, CA (US)

(72) Inventors: Vincent E. Parla, North Hampton, NH (US); Cullen Frishman Jennings, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 18/113,248

(22) Filed: Feb. 23, 2023

(65) Prior Publication Data

US 2023/0370424 A1 Nov. 16, 2023

Related U.S. Application Data

(60) Provisional application No. 63/341,557, filed on May 13, 2022.

(51) Int. Cl.
H04L 9/40 (2022.01)

(52) U.S. Cl.
CPC ...... H04L 63/0236 (2013.01); H04L 63/0281 (2013.01); H04L 63/0435 (2013.01)

(58) Field of Classification Search
CPC ............. H04L 63/0236; H04L 63/0281; H04L 63/0435; H04L 63/029; H04L 63/0407; H04L 63/0442

(Continued)

(56) References Cited

U.S. PATENT DOCUMENTS

| | | | | |
|---|---|---|---|---|
| 6,778,502 | B2 * | 8/2004 | Ricciulli | ................. H04L 45/22 |
| | | | | 370/252 |
| 9,853,885 | B1 * | 12/2017 | Tillotson | ............... H04L 45/306 |

(Continued)

FOREIGN PATENT DOCUMENTS

| | | | | | |
|---|---|---|---|---|---|
| CA | 2567897 | C | * | 5/2012 | ............. H04B 17/20 |
| EP | 3284287 | B1 | * | 6/2019 | ............. H04L 41/12 |
| EP | 4521688 | A1 | * | 3/2025 | ............. H04L 63/10 |

OTHER PUBLICATIONS

Wang, L., Ma, H., Li, Z., Pei, J., Hu, T., & Zhang, J. (2022). ZbSR: A Data Plane Security Model of SR-BE/TE based on Zero-Trust Architecture.

(Continued)

*Primary Examiner* — Khanh Q Dinh
(74) *Attorney, Agent, or Firm* — Lee & Hayes, P.C.

(57) ABSTRACT

Techniques for creating an optimal and secure data plane based on network constraints. The techniques may include establishing an initial networking connection for a data flow between a client device and a resource such that data plane traffic of the data flow is routed through a relay node disposed between the client device and the resource. In some examples, the techniques may include determining, using a Session Traversal Utilities for Network Address Translators (STUN) server, an alternate networking connection for the data flow that bypasses the relay node. Based at least in part on a determination that the alternate networking connection is a more optimal path for the data plane traffic than the initial networking connection, the techniques may include causing the data plane traffic of the data flow to be routed over the alternate networking connection.

20 Claims, 9 Drawing Sheets

(58) Field of Classification Search
USPC .......................................... 709/220, 224–229
See application file for complete search history.

(56) References Cited

U.S. PATENT DOCUMENTS

| | | | | |
|---|---|---|---|---|
| 9,871,720 | B1 * | 1/2018 | Tillotson | H04L 45/306 |
| 9,986,411 | B1 * | 5/2018 | Stamatakis | H04L 45/122 |
| 10,313,197 | B1 * | 6/2019 | Stamatakis | H04L 67/56 |
| 10,630,579 | B1 * | 4/2020 | Plenderleith | H04L 47/10 |
| 11,570,514 | B2 * | 1/2023 | Lee | H04N 21/4858 |
| 11,750,568 | B1 * | 9/2023 | Rasekh | H04L 67/56 |
| | | | | 726/1 |
| 2005/0254430 | A1 * | 11/2005 | Clark | H04L 45/28 |
| | | | | 370/241 |
| 2007/0094273 | A1 | 4/2007 | Fritsch | |
| 2007/0259653 | A1 * | 11/2007 | Tang | H04L 67/53 |
| | | | | 455/414.2 |
| 2008/0080532 | A1 | 4/2008 | O'Sullivan et al. | |
| 2010/0138649 | A1 | 6/2010 | Rossi | |
| 2011/0063976 | A1 * | 3/2011 | Birk | H04L 43/0888 |
| | | | | 370/235 |
| 2011/0314250 | A1 * | 12/2011 | Innan | G06F 3/067 |
| | | | | 711/E12.078 |
| 2017/0093625 | A1 * | 3/2017 | Pera | H04W 12/088 |
| 2017/0195132 | A1 * | 7/2017 | Burgio | H04L 12/46 |
| 2017/0317933 | A1 * | 11/2017 | Oran | H04L 45/38 |
| 2018/0124123 | A1 | 5/2018 | Moore et al. | |
| 2019/0342362 | A1 * | 11/2019 | Vysotsky | G06F 9/452 |
| 2020/0116441 | A1 * | 4/2020 | Rasmussen | G03G 15/2064 |
| 2020/0389426 | A1 | 12/2020 | Enguehard | |
| 2021/0014285 | A1 | 1/2021 | Maino | |
| 2021/0314297 | A1 * | 10/2021 | Peterson | H04L 63/0263 |
| 2022/0015793 | A1 * | 1/2022 | Li | A61B 17/3213 |
| 2022/0038440 | A1 | 2/2022 | Boynton | |
| 2022/0201041 | A1 * | 6/2022 | Keiser, Jr | H04L 41/0893 |
| 2022/0294828 | A1 * | 9/2022 | Keiser, Jr. | H04L 63/0245 |
| 2023/0018210 | A1 * | 1/2023 | Keiser, Jr. | H04L 63/0236 |
| 2023/0093942 | A1 * | 3/2023 | Koikara | H04L 9/3242 |
| | | | | 713/171 |
| 2023/0231768 | A1 * | 7/2023 | Vysotsky | H04L 41/40 |
| | | | | 370/254 |
| 2025/0080501 | A1 * | 3/2025 | Katyal | H04L 63/0272 |
| 2025/0080504 | A1 * | 3/2025 | Obulareddy | H04L 63/0272 |

OTHER PUBLICATIONS

The PCT Search Report and Written Opinion mailed Sep. 25, 2023 for PCT application No. PCT/US23/21929, 14 pages.

Shore, et all, "Zero Trust: The What, How, Why, and When", Cybersecurity and Trust, Oct. 22, 2021, Published by IEEE Computer Society, 10 pages.

Keranen A., et al., "Interactive Connectivity Establishment (ICE): A Protocol for Network Address Translator (NAT) Traversal", Internet Engineering Task Force (IETF), RFC: 8445, Jul. 2018, pp. 1-100.

Office Action for Indian Application No. 202427086603, dated Feb. 9, 2026, 9 Pages.

* cited by examiner

400

500

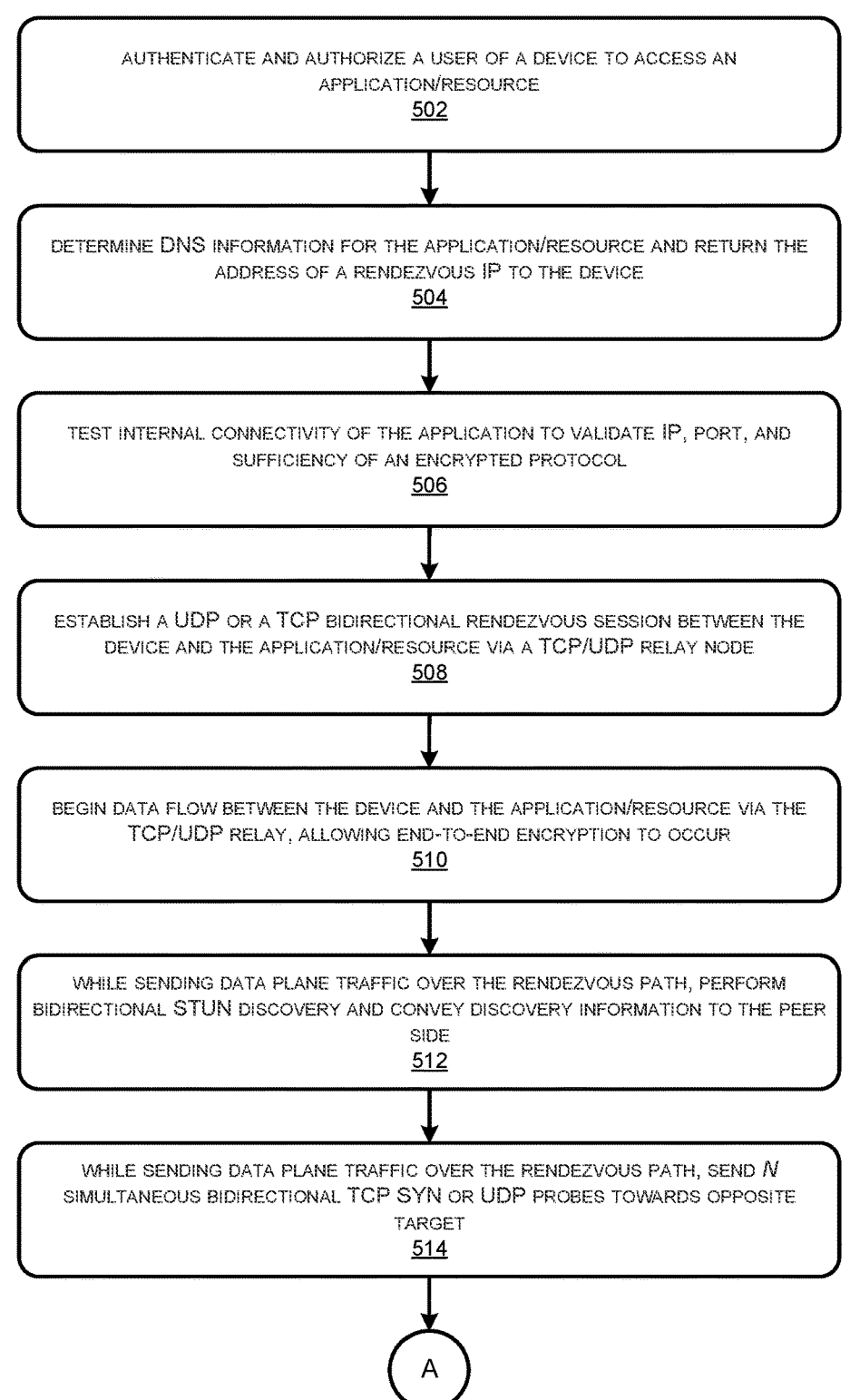

AUTHENTICATE AND AUTHORIZE A USER OF A DEVICE TO ACCESS AN
APPLICATION/RESOURCE
502

DETERMINE DNS INFORMATION FOR THE APPLICATION/RESOURCE AND RETURN THE
ADDRESS OF A RENDEZVOUS IP TO THE DEVICE
504

TEST INTERNAL CONNECTIVITY OF THE APPLICATION TO VALIDATE IP, PORT, AND
SUFFICIENCY OF AN ENCRYPTED PROTOCOL
506

ESTABLISH A UDP OR A TCP BIDIRECTIONAL RENDEZVOUS SESSION BETWEEN THE
DEVICE AND THE APPLICATION/RESOURCE VIA A TCP/UDP RELAY NODE
508

BEGIN DATA FLOW BETWEEN THE DEVICE AND THE APPLICATION/RESOURCE VIA THE
TCP/UDP RELAY, ALLOWING END-TO-END ENCRYPTION TO OCCUR
510

WHILE SENDING DATA PLANE TRAFFIC OVER THE RENDEZVOUS PATH, PERFORM
BIDIRECTIONAL STUN DISCOVERY AND CONVEY DISCOVERY INFORMATION TO THE PEER
SIDE
512

WHILE SENDING DATA PLANE TRAFFIC OVER THE RENDEZVOUS PATH, SEND $N$
SIMULTANEOUS BIDIRECTIONAL TCP SYN OR UDP PROBES TOWARDS OPPOSITE
TARGET
514

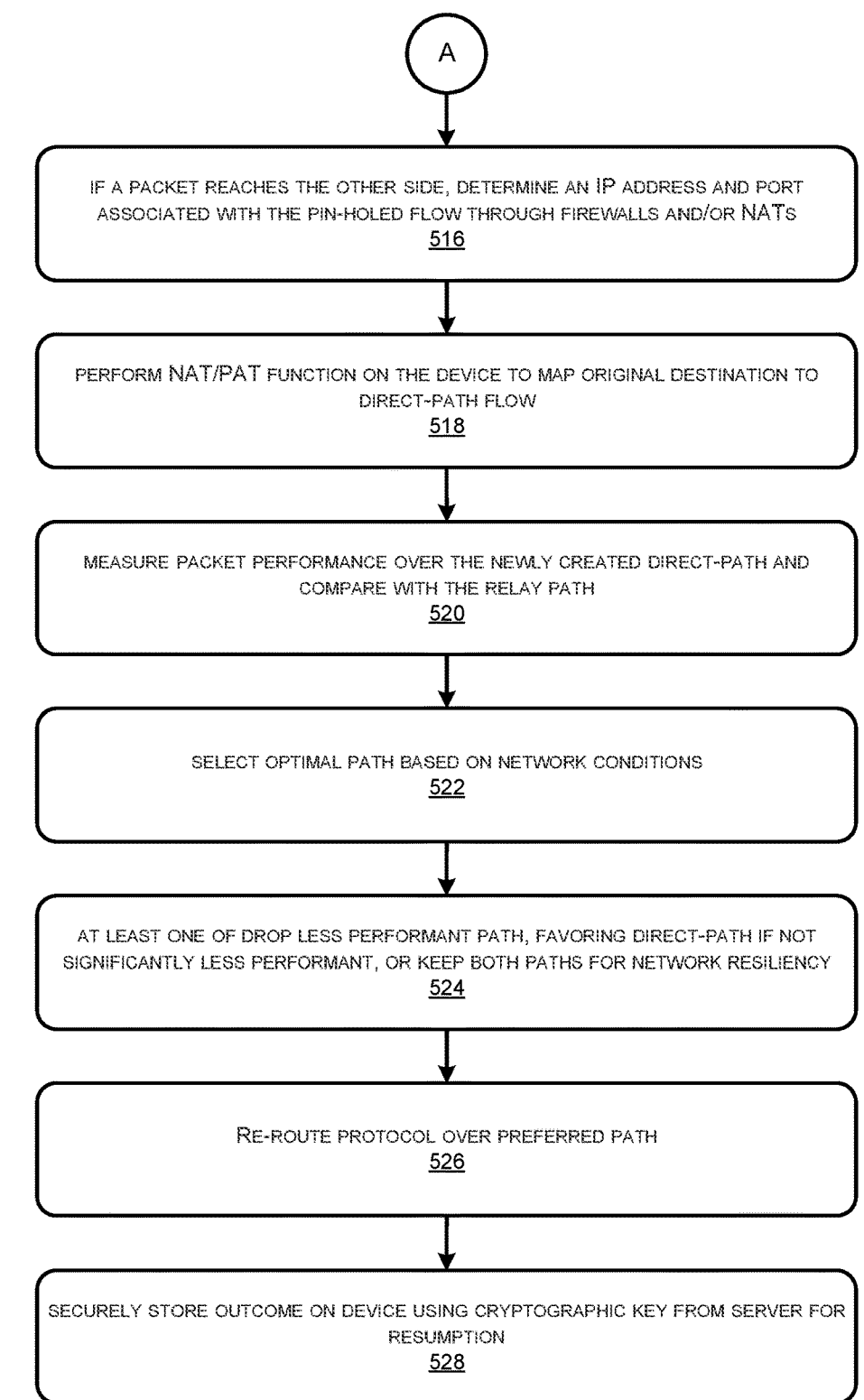

A

IF A PACKET REACHES THE OTHER SIDE, DETERMINE AN IP ADDRESS AND PORT ASSOCIATED WITH THE PIN-HOLED FLOW THROUGH FIREWALLS AND/OR NATs
516

PERFORM NAT/PAT FUNCTION ON THE DEVICE TO MAP ORIGINAL DESTINATION TO DIRECT-PATH FLOW
518

MEASURE PACKET PERFORMANCE OVER THE NEWLY CREATED DIRECT-PATH AND COMPARE WITH THE RELAY PATH
520

SELECT OPTIMAL PATH BASED ON NETWORK CONDITIONS
522

AT LEAST ONE OF DROP LESS PERFORMANT PATH, FAVORING DIRECT-PATH IF NOT SIGNIFICANTLY LESS PERFORMANT, OR KEEP BOTH PATHS FOR NETWORK RESILIENCY
524

RE-ROUTE PROTOCOL OVER PREFERRED PATH
526

SECURELY STORE OUTCOME ON DEVICE USING CRYPTOGRAPHIC KEY FROM SERVER FOR RESUMPTION
528

FIG. 5B

OPTIMAL DATA PLANE SECURITY AND CONNECTIVITY FOR SECURED CONNECTIONS

RELATED APPLICATIONS

This application claims priority to U.S. Provisional Application No. 63/341,557, titled "Data Plane Security and Connectivity for Zero Trust," and filed on May 13, 2022, the entire contents of which is incorporated herein by reference in its entirety and for all purposes.

TECHNICAL FIELD

The present disclosure relates generally to techniques for, among other things, creating an optimal data plane connection based on network constraints, while maintaining end-to-end encryption for the session.

BACKGROUND

The Zero Trust Network Access (ZTNA) model uses a trust broker inside of the enterprise perimeter to mediate connections between a specific private application and an authorized user. This allows teams to begin with zero trust, but then provide connectivity based on context (identity, device etc.). Unlike virtual private networks (VPNs), ZTNA technologies deliver a means of application access without wider network access, and the ability to mask applications from the open internet.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 5A and 5B are flow diagrams collectively illustrating another example method associated with the techniques described herein for creating an optimal data plane connection based on network constraints, while maintaining end-to-end encryption for the session.

DESCRIPTION OF EXAMPLE EMBODIMENTS

Overview

Figure 1:
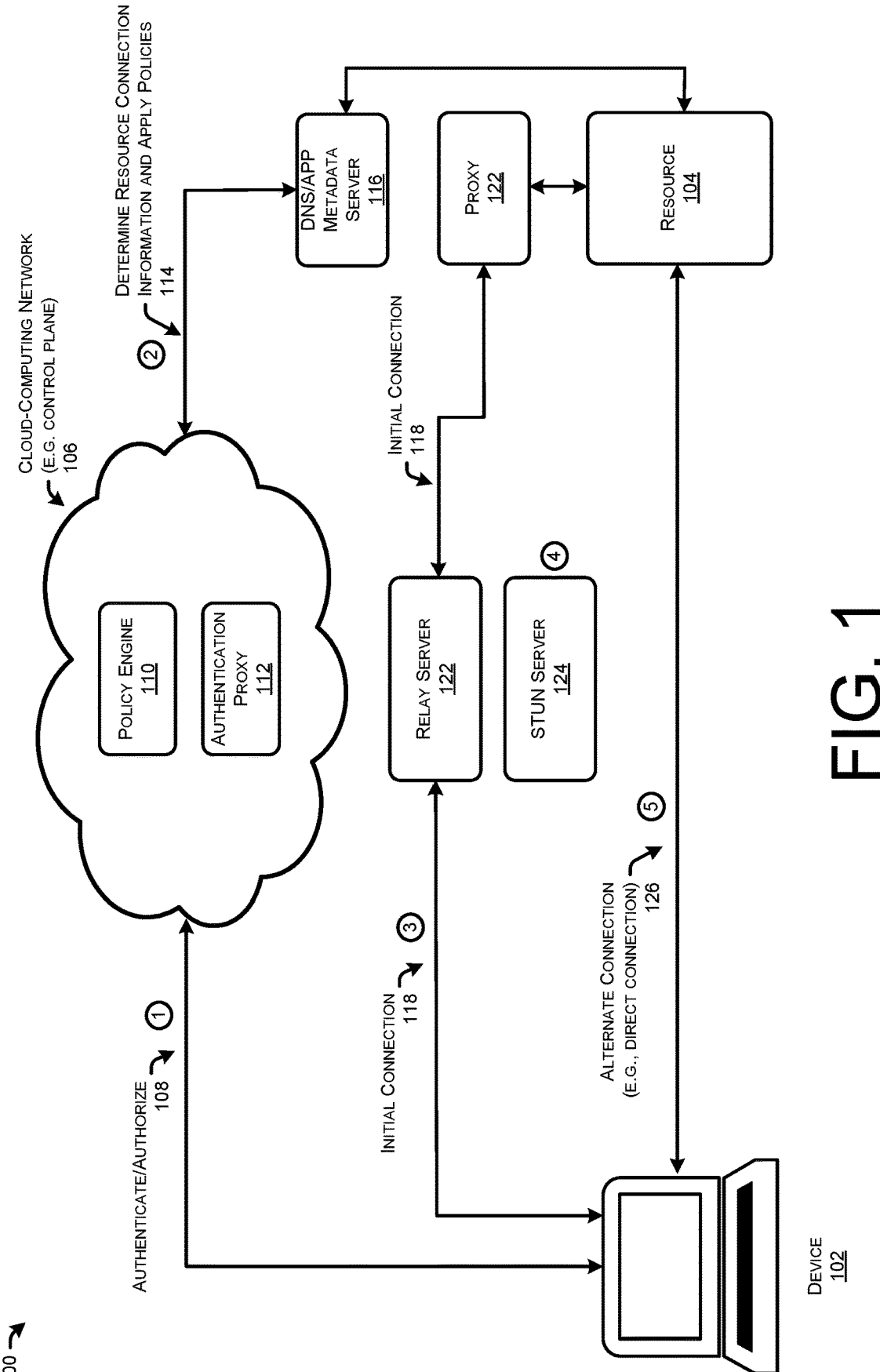
FIG. 1 illustrates an example architecture that may implement various aspects of the technologies described herein.

This disclosure describes various technologies for creating an optimal and secure data plane based on network constraints. By way of example, and not limitation, the techniques described herein may include establishing an initial networking connection for a data flow between a client device and a resource such that data plane traffic of the data flow is routed through a relay node disposed between the client device and the resource. In some examples, the techniques may include determining, using a Session Traversal Utilities for Network Address Translators (STUN) server, an alternate networking connection for the data flow that bypasses the relay node. Based at least in part on a determination that the alternate networking connection is a more optimal path for the data plane traffic than the initial networking connection, the techniques may include causing the data plane traffic of the data flow to be routed over the alternate networking connection.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

This application is directed to techniques for Zero Trust session creation by using the cloud as a Zero Trust Network Access (ZTNA) control plane and stitching the data plane together using multipathing techniques. The multipathing techniques allow for an optimal data path to be determined while also preserving the end-to-end encryption between the device and the resource (e.g., application). For example, the quality of an existing TCP or UDP based encryption protocol may be evaluated by a policy server and, if the protocol meets security policies, a direct path may be established between the device and the resource. In this way, secure transport protocols, such as (D)TLS 1.3, QUIC (HTTPs/3), NAT-T IPsec, Wireguard (Noise Protocol), etc. could go end-to-end between the device and resource without the need for an intermediary proxy. In other cases, such as when the encryption is not sufficient or absent, a proxy capability at both ends may be used to provide that functionality while still preserving a high degree of end-to-end encryption from the device to deep inside the enterprise network, close to the resource.

In some examples, a policy server disposed in a cloud-computing network may be utilized to perform various aspects of the technologies discloses herein. For example, a connection may initially be established between a client device and a resource, and the policy server may determine whether this initial connection can be optimized. For instance, the initial connection may be a ZTNA connection that goes through a turn server (e.g., relay server) to ensure that the connection is made successfully, but a more optimal and equally secure connection may be available. As such, in some examples, the policy server may determine the internal capabilities of the resource (e.g., what ports and protocols are used for connectivity with the resource) and map the Domain Name System (DNS) information associated with the resource. Additionally, the policy server may authenticate whether the entitlements of a user of the client device and/or network policy allows for the user/client device to connect to the resource in a way other than through the turn server/relay. For instance, policy might require inline DLP or other security functions for the alternate connection. Additionally, in some examples, the policy server may test the internal connectivity of the resource to determine if an alternate connection (e.g., direct connection) would provide sufficient security (e.g., whether there is strong transport encryption native to the resource).

In some examples, if the policy server determines that an alternate connection is possible that is sufficiently secure, the policy server may attempt an end-to-end session between the client device and the resource. For example, the policy server may initially setup a UDP or TCP (e.g., which may optionally be encapsulated) session at an edge or cloud rendezvous point (meet-me-here) protocol to start the session, and then the client device and the resource may begin transferring UDP or TCP packets while, simultaneously, the policy server is attempting to upgrade the session with a more optimal (e.g., direct) data path using STUN (Session Traversal Utilities for Network Address Translation), ICE (Interactive Connectivity Establishment), or a similar protocol, thereby essentially adapting the session dynamically to the most optimal path.

In some examples, the policy server may measure or otherwise determine which path (e.g., the initial connection or the alternate connection) is the most optimal path, with a preference towards the alternate path unless there is a significant performance difference. In some examples, the policy server may drop the less performant path based on network conditions and route all future UDP or TCP data on the preferred path. In some instances, the policy server may remember the outcome for future sessions associated with that resource on a given device and network (e.g., same SSID) and store the outcome cryptographically on the client device using a server-side key for resumption, for example.

In some examples, when an alternate connection does not meet security requirements or policies, a gateway/proxy function may be automatically inserted in front of the resource to provide sufficient transport encryption and/or any other security functions required by policy. Additionally, in some examples, an L3/L4 enforcement node can be placed between the device and the resource based on policy, and this enforcement node may have the ability to add or remove any encapsulation protocol that might be used between the client device and the resource. In some instances, this encapsulation layer may be used to carry additional metadata/identity while not interfering in the encrypted session. For instance, GUE or Geneve encapsulation may be added/removed by both the client device (e.g., a Zero Trust client/application running on the client device) and the network enforcement node.

In some examples, the Zero Trust client/application on the client device may do Network Address Translation (NAT)/Port Address Translation (PAT) functions to match up the intended application flow with the negotiated session which may be on a different IP or port relative to the connection that was attempted by some software application running on a device. For example, a browser might try to connect to a resource, www.foo.bar, on (IP:Port) 2.3.4.5:443, however the session may have been negotiated through the NAT and Firewall using on (IP:Port) 5.6.7.8:777. In such a scenario the Zero Trust nodes at both sides (client device and resource sides) may perform the appropriate NAT/PAT functionality to match the intent, without impacting the end-to-end encryption of the protocol itself.

Under some network conditions, it may be possible using the techniques described herein that a STUN-determined alternate path may only be available in one direction (e.g., from the resource towards the client device, but not from the client device towards the resource). In such a scenario, if the single-leg path is significantly better than the relay path, an asymmetric route may be established where the most favorable path in each direction is selected. This may result in a hybrid scenario where packets in one direction go over the relay/turn server while packets in the other direction go via the alternate path (e.g., direct path, proxy and relay path, etc.). The solution can optionally remember this configuration for future sessions to the same resource on the same client device and network (e.g., same SSID).

In some examples, protocol encapsulation may be used for different scenarios. For instance, encapsulation may be used to carry meta-data in the outer packet for user, application identity, or other use cases in order to share with an enforcement node on the path. As another example, encapsulation may be used for protocol conversion (e.g., encapsulate TCP in UDP for performance reasons or UDP in TCP for getting through an enterprise HTTP proxy). In some examples, encapsulation can also be used to include verifiable credentials within a packet. In examples, GRE, GUE, Geneve, or any other internet-resilient encapsulation protocol may be used for these purposes.

The MASQUE (Multiplexed Application Substrate over QUIC Encryption) protocol allows for proxying any other protocol over a QUIC (Quick UDP Internet Connections) connection. This might be desirable to use for multiplexed remote ZTNA sessions to improve performance characteristics of less resilient protocols, or an IP protocol other than UDP or TCP that is desired to "tunnel" to an enterprise application or resource. In some examples, the MASQUE termination can be done at the edge of the network (e.g., cloud or on-prem) via an edge firewall, edge proxy, or inside the network at the zero trust (ZT) proxy node. For some of these purposes, the encapsulation could be MASQUE or another proxy encapsulation protocol, or even VPN encapsulation.

In examples, when the MASQUE proxy is collocated at the zero-trust proxy, the same techniques described above may be used to find the optimal path (proxy or direct). Conversely, when the MASQUE proxy is on an edge of the network (e.g., cloud or on-prem), the TCP-SYN or UDP-PROBE sequence may be performed between the MASQUE edge proxy and the internal resource or zero-trust proxy node to discover any internal NAT or firewalls between the components. In some examples, the client device may be connecting directly to the MASQUE proxy and the MASQUE proxy may be applying NAT/PAT to the inner (decapsulated) protocol in order to reach the resource or ZT proxy node while maintaining end-to-end encryption of the inner (decapsulated) protocol.

In examples, in which the MASQUE node is collocated with the ZT proxy component, the operation may be identical to the examples previously described using the STUN techniques. However, when the MASQUE node is at the edge, the device may make a direct data plane connection with the MASQUE node. In this scenario, the ZT proxy near the application may make an in-out rendezvous at the MASQUE proxy relay over UDP or TCP, based on the encryption protocol. The lower-level protocol (UDP or TCP) may be stitched together so that the encrypted protocol can go end-to-end undisrupted. For instance, Linux sockmaps may be one way to implement the lower-level (UDP or TCP) relay function among others.

In this configuration there are a number of possible approaches. As one examples, an on-demand rendezvous may be used, where the MASQUE proxy signals the system that it has an inbound connection from the device for a given application. The appropriate ZT Proxy node may be contacted and initiates and outbound UDP or TCP Rendezvous session with the MASQUE Relay component to complete the low-level (UDP or TCP) protocol bridge. Once the Relay may be established the packets flow between the MASQUE node and the ZT Proxy, or ZT L3/L4 Enforcer when proxying may be not needed. As another example, an Idle "Connection"-Pool may be established from ZT Proxy/Enforcer Nodes with the MASQUE Proxy nodes. Ensuring at least one idle Relay session may be available between the nodes. When all idle relays sessions are consumed, a new idle session may be established from the ZT Proxy/Enforcer to the MASQUE Relay to service future end-to-end encrypted traffic. A Policy component may be used to determine the number of idle sessions between nodes to maintain since each MASQUE node might have multiple ZT Proxy/Enforcer nodes that it must maintain an idle session with and vice-versa.

In some examples, ephemeral certificates can be generated for an application that does not support encryption or has insufficient encryption. In this scenario, a root certificate can be deployed either out of band or by the ZT application itself during provisioning or at runtime via the policy engine. From that point forward, an ephemeral certificate may be auto-generated and enabled at the ZT Proxy node as needed for a given application. This may allow for end-to-end encryption between the endpoint device application (e.g., a browser) and the ZT Proxy.

In examples, a SAML (security assertion markup language), OAuth, or other Authentication Proxy (Auth Proxy) technology can be used in conjunction with the system to apply the flow-based policies. For example, once a user has successfully authenticated via the Auth Proxy, the flow level components can wire up the session. For example, post authentication, the UDP/TCP relay can begin passing session data associated with the application. Similarly, the ZT Enforcer or Proxy may allow traffic to flow once approved by the Auth Proxy component.

As described herein, in some instances there may be two categories of flows: unauthenticated and authenticated. In examples, an application may consist of one or more of each flow category. The solution described herein may allow for a policy to be configured to indicate any resources that must be reachable prior to authentication and also resources that are reachable post authentication. The enforcement nodes may allow the pre authenticated flows to pass based on the policy configuration for an application, while blocking flows that require authentication to complete before allowing it. The Kerberos protocol is a good example of a flow that might be allowed pre-authentication since the protocol itself is used to establish an authentication channel. In some examples, the Auth Proxy can also act as an authentication relay in order to limit the exposure of any on path authentication mechanisms, based on policy. In such a configuration, no network flows may commence until the Auth Proxy completes the authentication ceremony.

By way of example, and not limitation, a method according to the techniques described herein may include establishing an initial networking connection for a data flow between a client device and a resource such that data plane traffic of the data flow is routed through a relay node disposed between the client device and the resource. In some examples, the initial networking connection may be a Zero Trust Network Access (ZTNA) networking connection. In some examples, the relay node may be associated with a turn server. In some examples, data plane traffic may flow between the client device and the resource via the initial networking connection. In some examples, the resource may be an enterprise resource (e.g., a private resource) that the client device is accessing.

In some examples, the method may include determining, using a Session Traversal Utilities for Network Address Translators (STUN) server, an alternate networking connection for the data flow that bypasses the relay node. In some examples, the alternate networking connection may be at least one of a direct networking connection between the client device and the resource, a proxied networking connection, a proxy and relay networking connection that passes through a different relay node, or the like. In some examples, the alternate networking connection may be determined using the STUN server while, simultaneously, the data plane traffic of the data flow is being sent between the client device and the resource via the initial networking connection. In some examples, determining the alternate networking connection using the STUN server may include determining an internet protocol (IP) address and a port associated with a pin-holed flow through one or more networking components or security components disposed between the client device and the resource.

In some examples, prior to determining the alternate networking connection, the method may further include determining whether a security policy allows for the alternate networking connection to be made between the client device and the resource. As such, determining the alternate networking connection using the STUN server may be based at least in part on a determination that the security policy allows for the alternate networking connection to be made. Additionally, or alternatively, prior to determining the alternate networking connection, the method may further include determining whether an encryption protocol associated with the resource satisfies a security policy. As such, determining the alternate networking connection using the STUN server may be based at least in part on a determination that the encryption protocol satisfies the security policy.

In some examples, the method may include determining whether the alternate networking connection is a more optimal path for the data plane traffic than the initial networking connection. For instance, based at least in part on a determination that the alternate networking connection is a more optimal path for the data plane traffic than the initial networking connection, the method may include causing the data plane traffic of the data flow to be routed over the alternate networking connection. Alternatively, the method may include refraining from causing the data plane traffic of the data flow to be routed over the alternate networking connection based at least in part on determining that the alternate networking connection is a less optimal path than the initial networking connection.

In examples, determining whether the alternate networking connection is the more optimal path for the data plane traffic than the initial networking connection may include determining whether routing the data plane traffic over the alternate networking connection instead of the initial networking connection would at least one of increase an amount of available bandwidth for the data flow, decrease a cost associated with the data flow, decrease a latency associated with the data flow, decrease an amount of compute associated with sending the data plane traffic, or achieve a more uniform distribution of resources or resource utilization (e.g., better load balancing).

In some examples, the method may also include causing the client device to store an indication that the alternate networking connection is the more optimal path for future connections to the resource. In some examples, it may be determined that the alternate networking connection between the client device and the resource fails to meet a security policy requirement, and the method may include causing the data plane traffic to flow through a security function associated with the resource when the data plane traffic is routed over the alternate networking connection to meet the security policy requirement.

In some examples, the alternate networking connection may be the more optimal path for the data plane traffic that is being sent from the resource to the client device and the initial networking connection may be the more optimal path for the data plane traffic that is being sent to the resource from the client device. In such a scenario, the method may include causing the data plane traffic that is being sent from the resource to the client device to be routed over the alternate networking connection and causing the data plane traffic that is being sent to the resource from the client device to be routed over the initial networking connection.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein. The architecture 100 includes a device 102, a resource 104 that the device 102 is accessing, and a cloud computing network 106, which may act as a control plane for the communication session between the device 102 and the resource 104.

The device 102 may be any computing device capable of network communications, such as a desktop computer, laptop computer, cell phone, tablet, or the like. In some examples, the device 102 may be running a client, such as a ZTNA client, VPN client, or the like to facilitate secured communications between the device 102 and the resource 104. In examples, the resource 104 may be a private enterprise resource, application, or the like.

To connect with the resource 104, the device 102 may, at "1," perform an operation 108 in which the device 102 is authenticated and/or authorized for access to the resource 104. In some examples, a policy engine 110 and an authentication proxy 112 of the cloud-computing network 106 may authenticate and/or authorize the device 102 for access to the resource 104. At "2," the policy engine 110 may perform an action 114 of determining the resource connection information. For instance, the policy engine 110 may obtain the resource connection information from a DNS/Application Metadata Server 116. In some examples, the resource connection information may include an IP address, port, protocol, or the like associated with the resource 104.

After authenticating and/or authorizing the device 102 for connecting to the resource, the cloud-computing network 106 may provide the resource connection information to the device 102. In this way, at "3," an initial connection 118 (e.g., an initial networking connection) may be established between the device 102 and the resource 104. For instance, the initial connection 118 may go through a relay server 120 and a proxy 122 disposed between the device 102 and the resource 104.

While data plane traffic is flowing along the initial connection 118, at "4," a STUN server 124 may be used to determine whether an alternate connection 126 is possible (e.g., a direct connection that bypasses the relay server 210. In some examples, this may include the STUN server 124 being utilized to perform bidirectional STUN discovery and conveying discovery information to the peer side. For instance, the STUN server 124 may send N simultaneous bidirectional TCP SYN and/or UDP Probe packets towards the opposite target (e.g., from device 102 towards resource 104 and vice-versa). In some examples, a Zero-Trust Bootstrap can spoof, in line map, or create the packets used for the TCP-SYN or UDP Probes. If a packet reaches the other side, the STUN server 124 may determine the IP address and port associated with the pin-holed flow through any firewalls, NATs, or other networking or security components between the device 102 and the resource 104.

If the alternate connection 126 is better than the initial connection 118, the device 102 may perform NAT/PAT functions to map the original destination to the alternate connection 126. In some examples, the less performant path (e.g., the initial connection 118 or the alternate connection 126) may be dropped in favor of the better path. Additionally, or alternatively, both paths/connection may be kept open for network resiliency.

Figure 2A:
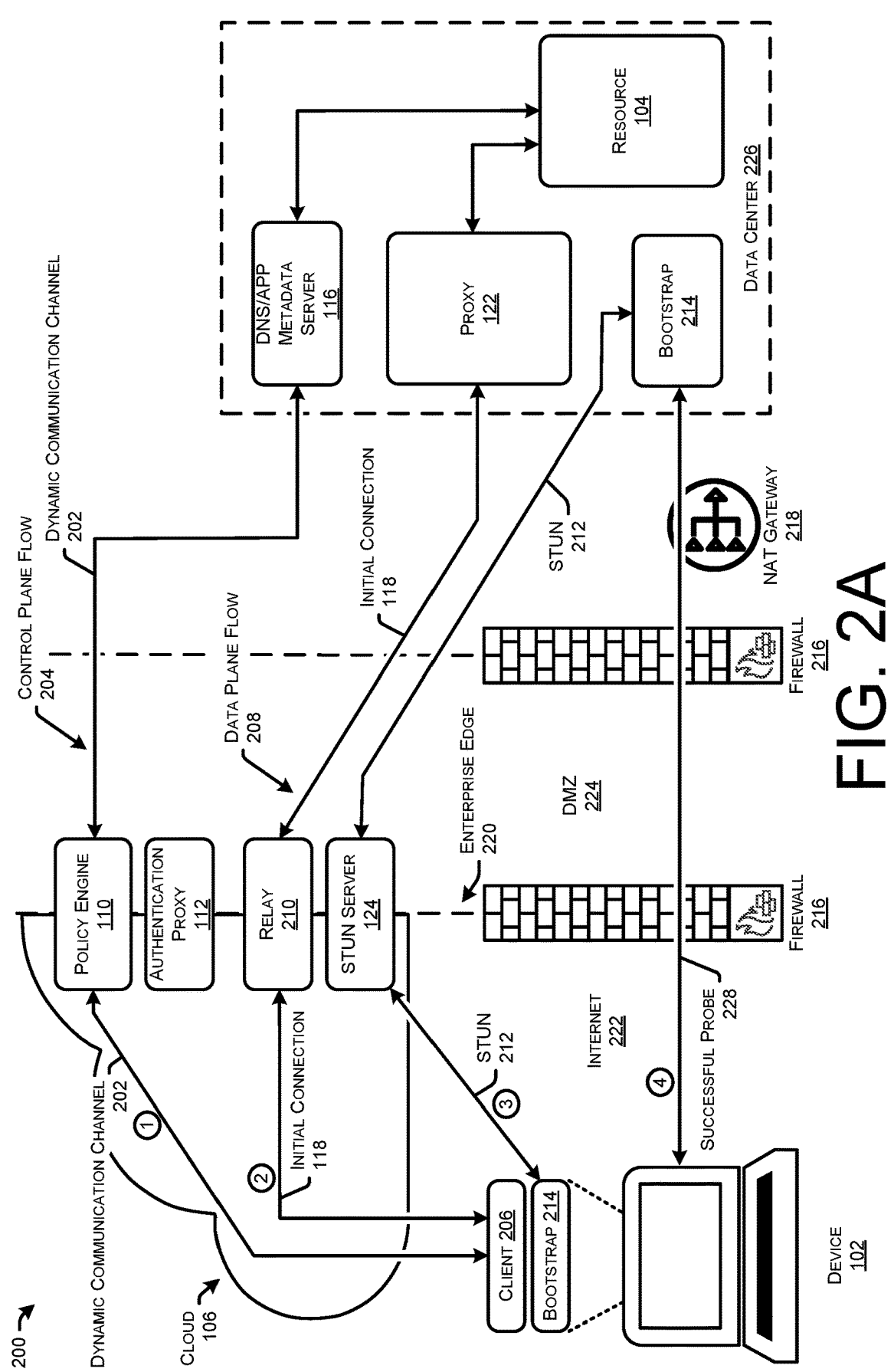
FIGS. 2A-2C illustrate an example architecture and implementation steps associated with various aspects of the technologies described herein.
Figure 2B:
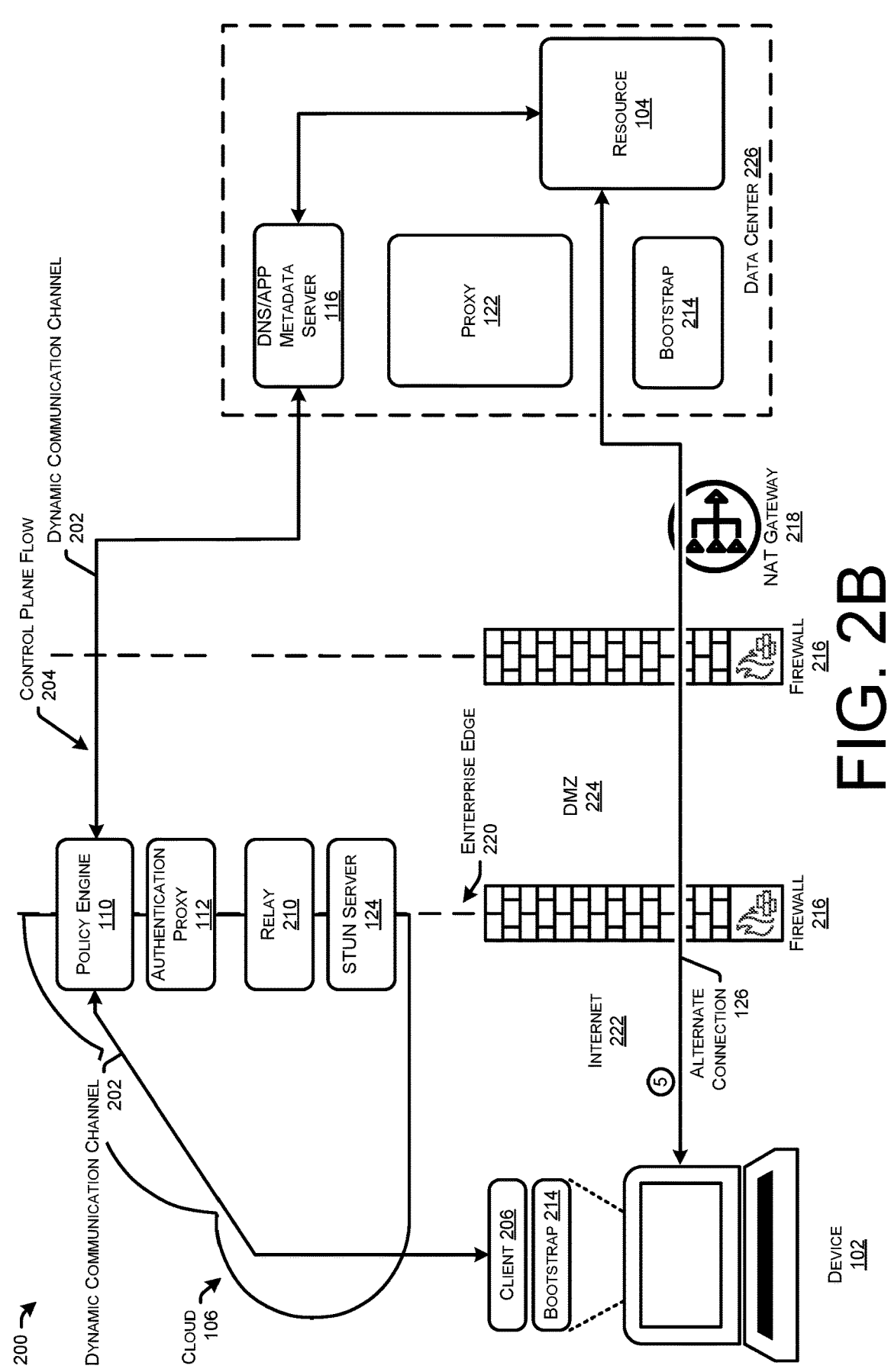
Figure 2C:
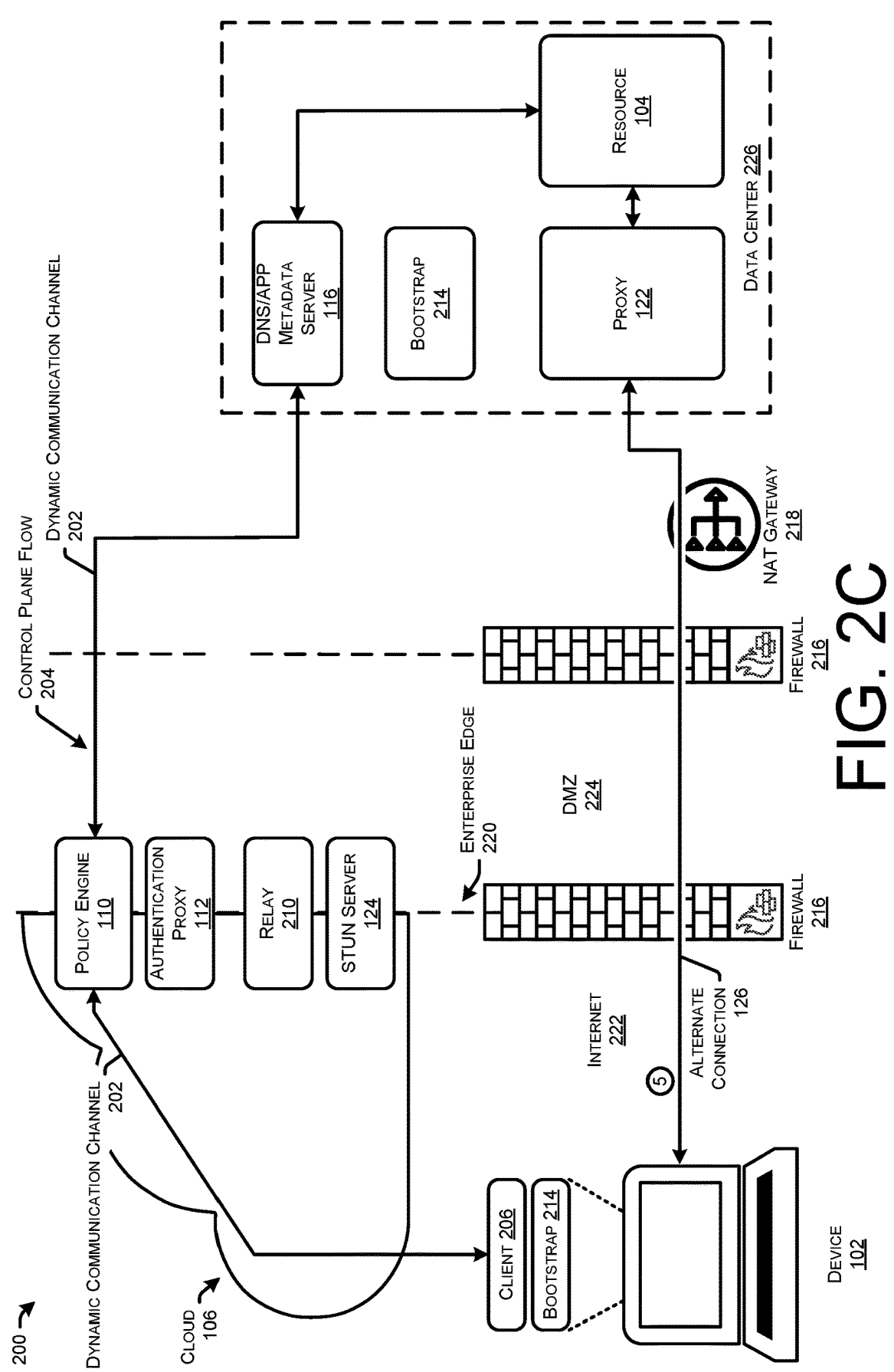

FIGS. 2A-2C illustrate an example architecture 200 and implementation steps associated with various aspects of the technologies described herein. The architecture 200 includes the device 102 and the resource 104. In some examples, a dynamic communication channel 202 (e.g., dynamic connection, long-lived bus connection, etc.) is established between the device 102 and the DNS and/or Application Metadata server 116 for the control plane flow 204 associated with the data flow between the device 102 and the resource 104. In examples, the dynamic communication channel 202 may connect the client 206 running on the device 102 with the policy engine 110 and the policy engine 110 with the DNS and/or Application Metadata Server 116.

In some examples, at "1," the device 102 may be authenticated and/or authorized to connect with the resource 104. In some examples, the policy engine 110 and/or the authentication proxy 112 may authenticate and/or authorize a user of the device 102 for access to the resource 104. Additionally, in some examples, the policy engine 110 may determine the resource 104 connection information. For instance, the policy engine 110 may obtain the resource connection information from the DNS/Application Metadata Server 116. In some examples, the resource connection information may include an IP address, port, protocol, or the like associated with the resource 104. In some examples, the DNS/Application Metadata Server 116 may verify that the resource 104 is on the correct port. IP address, and/or protocol that was provided to the policy engine 110. After authenticating and/or authorizing the device 102 for connecting to the resource 104, the cloud-computing network 106 may provide the resource connection information to the client 206 of the device 102.

At "2," the initial connection 118 (e.g., an initial networking connection) for the data plane flow 208 is established between the device 102 and the resource 104. For instance, the initial connection 118 goes through a relay node 210 and the proxy 122 disposed between the device 102 and the resource 104.

While the data plane traffic is flowing along the initial connection 118, at "3," the STUN server 124 performs bidirectional STUN discovery 212 and conveys discovery information to the peer side. For instance, the STUN server 124 may send N simultaneous bidirectional TCP SYN and/or UDP Probe packets towards the opposite target (e.g., from device 102 towards resource 104 and vice-versa). In some examples, a bootstrap 214 (e.g., ZT bootstrap) can spoof, in line map, or create the packets used for the TCP-SYN or UDP Probes. If, at "4," a successful probe 228 reaches the other side, the STUN server 124 may determine the IP address and port associated with the pin-holed flow through the firewalls 216, NAT gateway 218, or any other networking or security components between the device 102 and the resource 104. In some examples, a firewall 216 is disposed on the enterprise edge 220 between the internet 222 and the DMZ 224, and another firewall 216 is disposed between the DMZ 224 and the NAT gateway 218, which are both in front of the data center 226.

FIGS. 2B and 2C illustrate different forms that the alternate connection 126 can take. If the alternate connection 126 is better than the initial connection 118, the device 102 may perform NAT/PAT functions to map the original destination to the alternate connection 126. In some examples, the less performant path (e.g., the initial connection 118 or the alternate connection 126) may be dropped in favor of the better path. Additionally, or alternatively, both paths/connection may be kept open for network resiliency.

In FIG. 2B, policy allows for the alternate connection 126 to be made directly between the device 102 and the resource 104 such that the alternate connection is pin-holed through the firewalls 216 and the NAT gateway 218 without needing additional encryption. For instance, the resource 104 encryption may be strong enough that no additional security functions are needed. In FIG. 2C, in contrast the alternate connection 126 is required to be passed through a proxy 122 in front of the resource 104. In examples, additional security functions may also be added based on policy.

Figure 3:
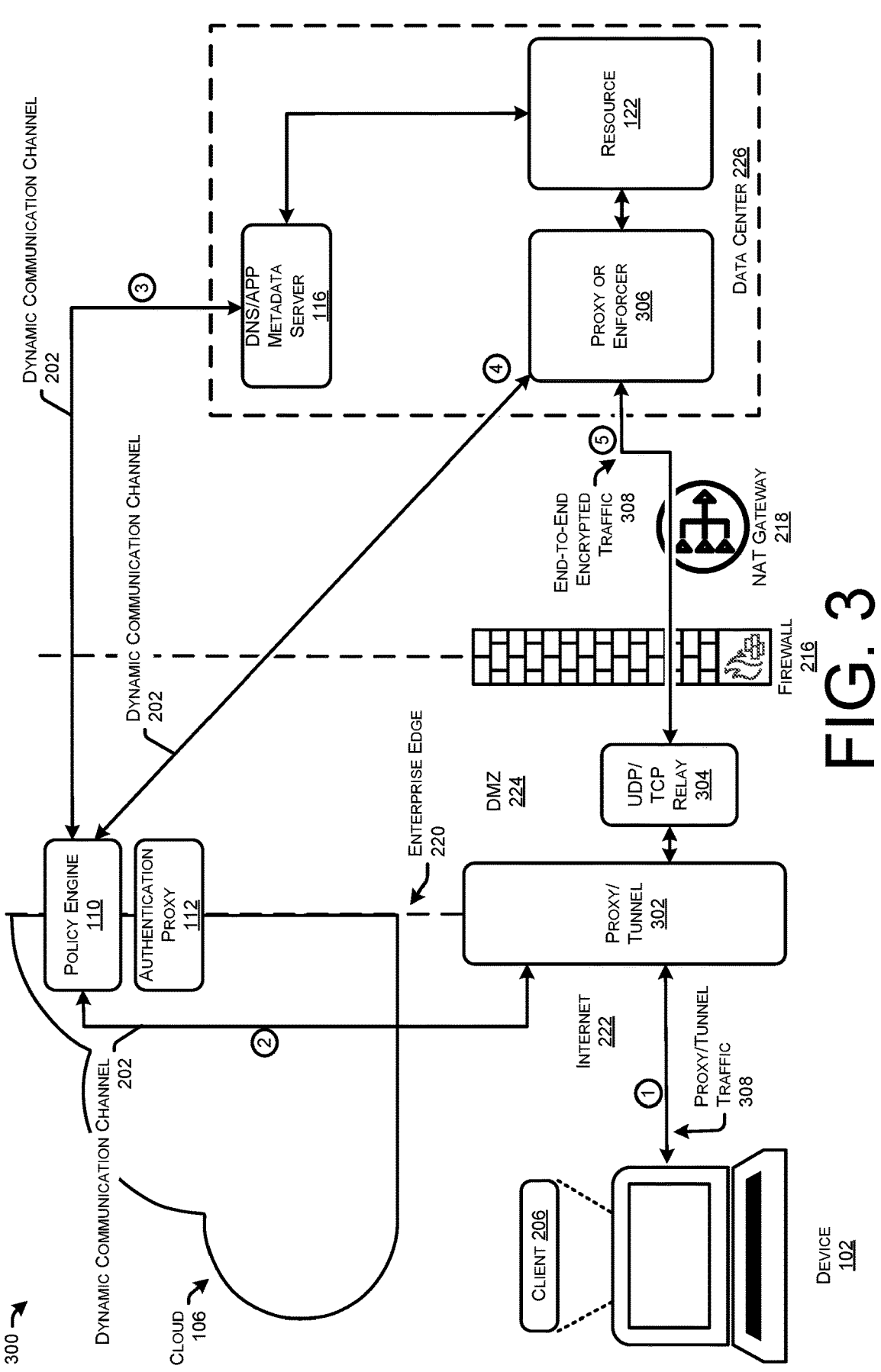
FIG. 3 illustrates yet another example architecture and implementation steps associated with the technologies described herein.

FIG. 3 illustrates yet another example architecture 300 and implementation steps associated with the technologies described herein. In the architecture 300, a proxy/tunnel headend 302 is located at the enterprise edge 220, and a UDP/TCP relay 304 is between the proxy/tunnel headend 302 and the firewall 216. In some examples the proxy/tunnel headend 302 may be a MASQUE proxy, an in-out site-to-site VPN tunnel headend, an edge proxy, or the like.

At "1," proxy/tunnel traffic 308 flows between the device 102 and the proxy/tunnel headend 302. At "2," the proxy/tunnel headend 302 and/or the policy engine 110 may set up the connection between the device 102 and the resource 104. For instance, the device 102 may be authenticated and/or authorized for the connection, and the policy engine 110 may exchange connection/target information with the device 102.

At "3," the policy engine 110 and/or the DNS/Application Metadata Server 116 may use the dynamic communication channel 202 to exchange connection information, application information, DNS information, or the like associated with the resource 104. At "4," the policy engine 110 and the proxy or enforcer 306 may authorize/allow an in-out session to begin between the resource 104 and the device 102.

At "5," end-to-end encrypted traffic 308 (e.g., data plane traffic) may flow between the device 102 and the resource 104. For instance, the end-to-end encrypted traffic may flow from the device 102, through the proxy/tunnel headend 302, through the UDP/TCP relay 304, and then through the firewall 216 and NAT gateway 218 to the proxy or enforcer 306 before arriving at the resource 104. In some examples, the end-to-end encrypted traffic 308 may be MASQUE encapsulated traffic, site-to-site VPN traffic, or the like.

Figure 4:
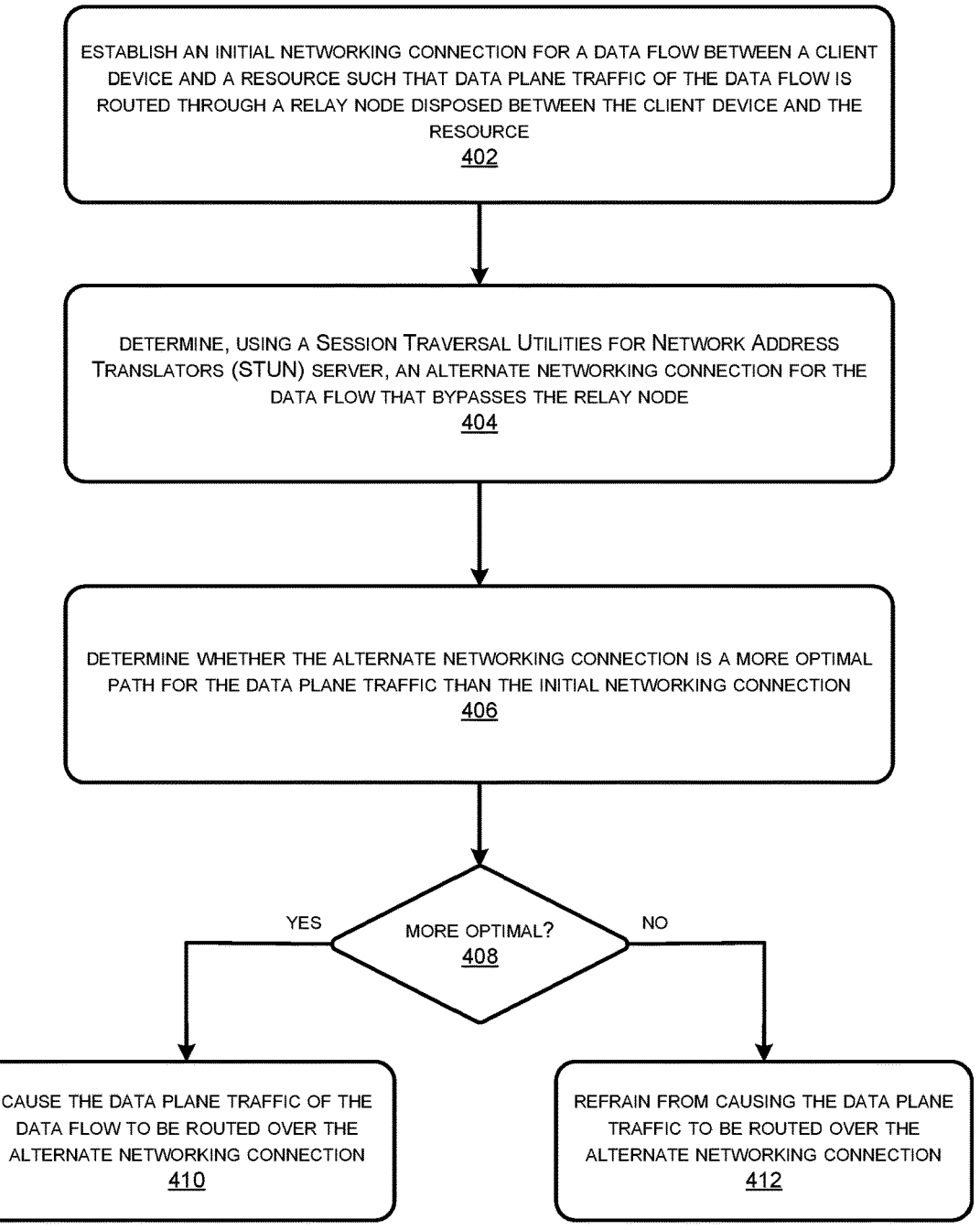
FIG. 4 is a flow diagram illustrating an example method associated with the techniques described herein for creating an optimal data plane connection based on network constraints, while maintaining end-to-end encryption for the session.

FIGS. 4, 5A, and 5B are flow diagrams illustrating example methods 400 and 500 associated with the techniques described herein. The logical operations described herein with respect to FIGS. 4, 5A, and 5B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 4, 5A, and 5B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 is a flow diagram illustrating an example method 400 associated with the techniques described herein for creating an optimal data plane connection based on network constraints, while maintaining end-to-end encryption for the session. The method 400 begins at operation 402, which includes establishing an initial networking connection for a data flow between a client device and a resource such that data plane traffic of the data flow is routed through a relay node disposed between the client device and the resource. For instance, the policy engine 110 may establish the initial networking connection. In some examples, the initial networking connection is a secured networking connection.

At operation 404, the method 400 includes determining, using a Session Traversal Utilities for Network Address Translators (STUN) server, an alternate networking connection for the data flow that bypasses the relay node. For instance, the policy engine 110 may use the STUN server 124 to determine the alternate networking connection for the data flow. In some examples, the alternate networking connection may be a direct connection or may pass through a different relay node.

At operation 406, the method 400 includes determining whether the alternate networking connection is a more optimal path for the data plane traffic than the initial networking connection. For instance, the policy engine 110 may determine whether routing the data plane traffic over the alternate networking connection instead of the initial networking connection would increase an amount of available bandwidth for the data flow, decrease a cost associated with the data flow, decrease a latency associated with the data flow, decrease an amount of compute associated with sending the data plane traffic, achieve a more uniform distribution of resources or resource utilization, and/or the like. At operation 408, if the alternate networking connection is more optimal, then the method 400 proceeds to operation 410. However, if the alternate networking connection is less optimal than the initial connection, then the method 400 proceeds to operation 412.

At operation 410, the method 400 includes causing the data plane traffic of the data flow to be routed over the alternate networking connection. For instance, the policy engine 110 may cause the data plane traffic of the data flow to be routed over the alternate networking connection.

At operation 412, the method 400 includes refraining from causing the data plane traffic to be routed over the alternate networking connection. For instance, the policy engine 110 may refrain from causing the data plane traffic to be routed over the alternate networking connection.

FIGS. 5A and 5B are flow diagrams collectively illustrating another example method 500 associated with the techniques described herein for creating an optimal data plane connection based on network constraints, while maintaining end-to-end encryption for the session. The method 500 begins at operation 502, which includes authenticating and authorizing a user of a device to access an application/resource.

At operation 504, the method 500 includes determining DNS information for the application/resource and return the address of a rendezvous IP to the device. At operation 506, the method 500 includes testing internal connectivity of the application to validate IP, port, and sufficiency of an encrypted protocol.

At operation 508, the method 500 includes establishing a UDP or a TCP bidirectional rendezvous session between the device and the application/resource via a TCP/UDP relay node. At operation 510, the method 500 includes beginning a data flow between the device and the application/resource via the TCP/UDP relay, allowing end-to-end encryption to occur.

At operation 512, the method 500 includes while sending data plane traffic over the rendezvous path, performing bidirectional STUN discovery and convey discovery information to the peer side. At operation 514, the method 500 includes while sending data plane traffic over the rendezvous path, sending N simultaneous bidirectional TCP SYN or UDP probes towards opposite target.

Turning to FIG. 5B, at operation 516, the method 500 includes, if a packet reaches the other side, determining an IP address and port associated with the pin-holed flow through firewalls and/or NATs. At operation 518, the method 500 includes performing NAT/PAT function on the device to map the original destination to the direct-path flow.

At operation 520, the method 500 includes measuring packet performance over the newly created direct-path and compare with the relay path. At operation 522, the method 500 includes selecting the optimal path based on network conditions. At operation 524, the method 500 includes at least one of dropping the less performant path, favoring the direct-path if it is not significantly less performant, or keeping both paths for network resiliency.

At operation 526, the method 500 includes re-routing the protocol over the preferred path. And, at operation 528, the method 500 includes securely storing the outcome on the device using a cryptographic key from the policy server for resumption.

Figure 6:
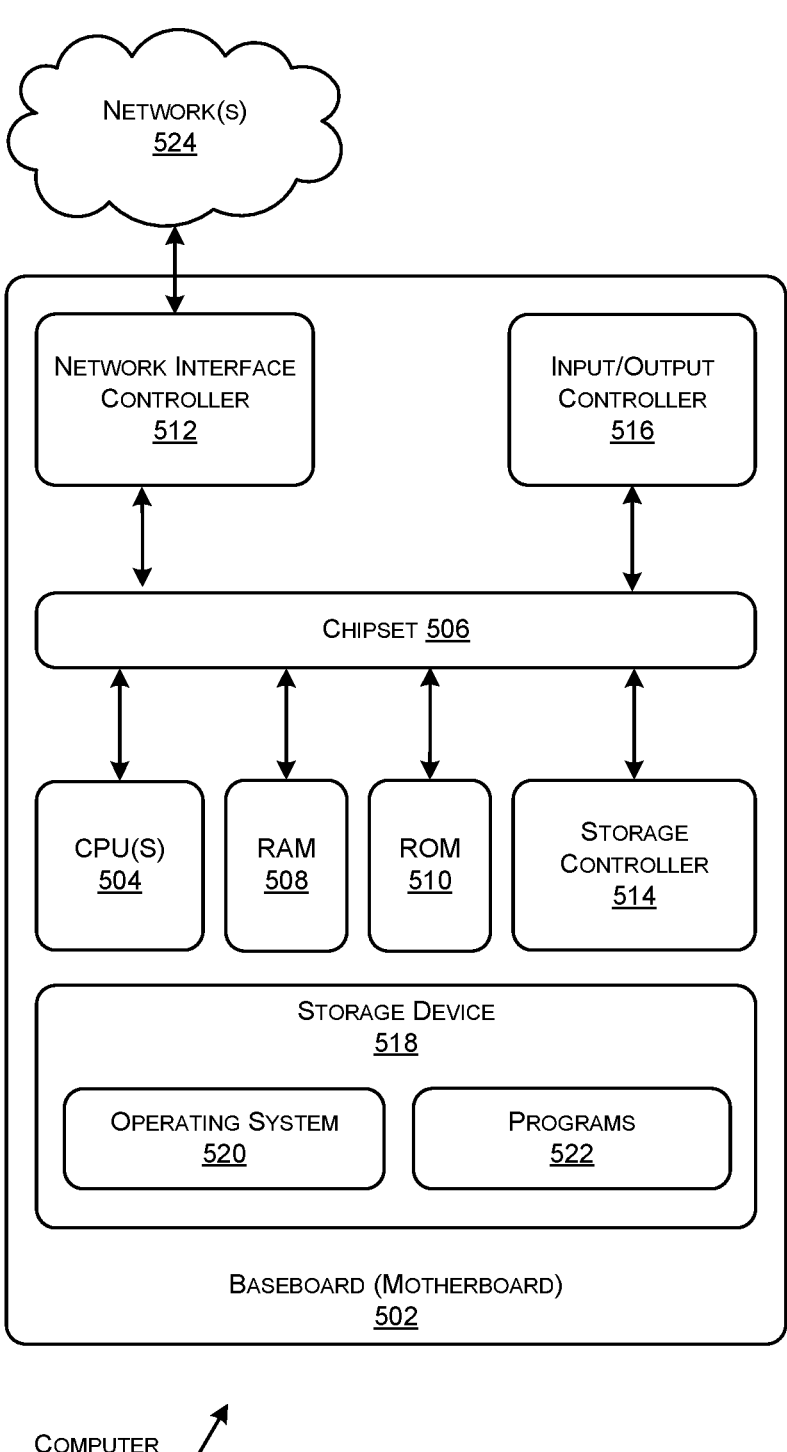
FIG. 6 is a computer architecture diagram showing an illustrative computer hardware architecture for implementing a computing device that can be utilized to implement aspects of the various technologies presented herein.

FIG. 6 is a computer architecture diagram showing an illustrative computer hardware architecture for implementing a computing device that can be utilized to implement aspects of the various technologies presented herein. The computer architecture shown in FIG. 6 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network. The chipset 606 can include functionality for providing network connectivity through a NIC 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems. In some examples, the NIC 612 may be configured to perform at least some of the techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the architecture 100 and or any components included therein, may be supported by one or more devices similar to computer 600. Stated otherwise, some or all of the operations performed by the architecture 100, and or any components included therein, may be performed by one or more computer devices 600 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes and functionality described above with regard to FIGS. 1-5B, and herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The computer 600 may include one or more hardware processors (processors) configured to execute one or more stored instructions. The processor(s) may comprise one or more cores. Further, the computer 600 may include one or more network interfaces configured to provide communications between the computer 600 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for creating an optimal data plane connection based on network constraints, while maintaining end-to-end encryption for the session.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

establishing an initial networking connection for a data flow between a client device and a resource such that data plane traffic of the data flow is routed through a relay node disposed between the client device and the resource;

determining, using a Session Traversal Utilities for Network Address Translators (STUN) server, an alternate networking connection for the data flow that bypasses the relay node;

determining that the alternate networking connection is a direct networking connection between the client device and the resource instead of the initial networking connection being the direct network connection;

determining a comparison between performance characteristics of the alternate networking connection and performance characteristics of the initial networking connection;

determining, based at least in part on the comparison and the alternate networking connection being the direct networking connection between the client device and the resource instead of the initial networking connection being the direct network connection, that the alternate networking connection is a more optimal path for the data plane traffic than the initial networking connection; and based at least in part on the determination that the alternate networking connection is the more optimal path for the data plane traffic than the initial networking connection, causing the data plane traffic of the data flow to be routed over the alternate networking connection.

2. The method of claim 1, wherein the alternate networking connection is determined using the STUN server while, simultaneously, the data plane traffic of the data flow is being sent between the client device and the resource via the initial networking connection.

3. The method of claim 1, wherein determining the alternate networking connection using the STUN server comprises determining an internet protocol (IP) address and a port associated with a pin-holed flow through one or more networking components or security components disposed between the client device and the resource.

4. The method of claim 1, further comprising determining whether a security policy allows for the alternate networking connection to be made between the client device and the resource, and wherein determining the alternate networking connection using the STUN server is based at least in part on a determination that the security policy allows for the alternate networking connection to be made.

5. The method of claim 1, further comprising causing the client device to store an indication that the alternate networking connection is the more optimal path for future connections to the resource.

6. The method of claim 1, further comprising determining whether an encryption protocol associated with the resource satisfies a security policy, and wherein determining the alternate networking connection using the STUN server is based at least in part on a determination that the encryption protocol satisfies the security policy.

7. The method of claim 1, further comprising:

determining that the alternate networking connection between the client device and the resource fails to meet a security policy requirement; and causing the data plane traffic to flow through a security function associated with the resource when the data plane traffic is routed over the alternate networking connection.

8. The method of claim 1, further comprising refraining from causing the data plane traffic of the data flow to be routed over the alternate networking connection based at least in part on determining that the alternate networking connection is a less optimal path than the initial networking connection.

9. The method of claim 1, wherein the alternate networking connection is the more optimal path for the data plane traffic that is being sent from the resource to the client device and the initial networking connection is the more optimal path for the data plane traffic that is being sent to the resource from the client device, the method further comprising:

causing the data plane traffic that is being sent from the resource to the client device to be routed over the alternate networking connection; and causing the data plane traffic that is being sent to the resource from the client device to be routed over the initial networking connection.

10. The method of claim 1, wherein determining, based at least in part on the comparison and one or more network conditions, that the alternate networking connection is the more optimal path for the data plane traffic than the initial networking connection is based on at least one of:

an increase in an amount of available bandwidth for the data flow;

a decrease in a cost associated with the data flow;

a decrease in a latency associated with the data flow;

a decrease in an amount of compute associated with sending the data plane traffic; or achieving a more uniform distribution of resources or resource utilization.

11. A system comprising:

one or more processors; and one or more non-transitory computer-readable media storing instructions that, when executed, cause the one or more processors to perform operations comprising:

establishing an initial networking connection for a data flow between a client device and a resource such that data plane traffic of the data flow is routed through a relay node disposed between the client device and the resource;

determining, using a Session Traversal Utilities for Network Address Translators (STUN) server, an alternate networking connection for the data flow between the client device and the resource that bypasses the relay node;

determining that the alternate networking connection is a direct networking connection between the client device and the resource instead of the initial networking connection being the direct network connection;

determining a comparison between performance characteristics of the alternate networking connection and performance characteristics of the initial networking connection;

determining, based at least in part on the comparison and the alternate networking connection being the direct networking connection between the client device and the resource instead of the initial networking connection being the direct network connection, whether the alternate networking connection is a more optimal path for the data plane traffic than the initial networking connection; and based at least in part on determining that the alternate networking connection is the more optimal path, causing the data plane traffic of the data flow to be routed over the alternate networking connection.

12. The system of claim 11, wherein the alternate networking connection is determined using the STUN server while, simultaneously, the data plane traffic of the data flow is being sent between the client device and the resource via the initial networking connection.

13. The system of claim 11, wherein determining the alternate networking connection using the STUN server comprises determining an internet protocol (IP) address and a port associated with a pin-holed flow through one or more network security components disposed between the client device and the resource.

14. The system of claim 11, the operations further comprising determining whether a security policy allows for the alternate networking connection to be made between the client device and the resource, and wherein determining the alternate networking connection using the STUN server is based at least in part on a determination that the security policy allows for the alternate networking connection to be made.

15. The system of claim 11, the operations further comprising determining whether an encryption protocol associated with the resource satisfies a security policy, and wherein determining the alternate networking connection using the STUN server is based at least in part on a determination that the encryption protocol satisfies the security policy.

16. The system of claim 11, the operations further comprising:

determining that the alternate networking connection between the client device and the resource fails to meet a security policy requirement; and causing the data plane traffic to flow through a security function associated with the resource when the data plane traffic is routed over the alternate networking connection.

17. One or more non-transitory computer-readable media storing instructions that, when executed, cause one or more computing devices to perform operations comprising:

establishing an initial networking connection for a data flow between a client device and a resource such that data plane traffic of the data flow is routed through a relay node disposed between the client device and the resource;

determining, using a Session Traversal Utilities for Network Address Translators (STUN) server, an alternate networking connection for the data flow between the client device and the resource that bypasses the relay node;

determining that the alternate networking connection is a direct networking connection between the client device and the resource instead of the initial networking connection being the direct network connection;

determining a comparison between performance characteristics of the alternate networking connection and performance characteristics of the initial networking connection;

determining, based at least in part on the comparison and the alternate networking connection being the direct networking connection between the client device and the resource instead of the initial networking connection being the direct network connection, whether the alternate networking connection is a more optimal path for the data plane traffic than the initial networking connection; and based at least in part on determining that the alternate networking connection is the more optimal path, causing the data plane traffic of the data flow to be routed over the alternate networking connection.

18. The method of claim 1, wherein the initial networking connection is a Zero Trust Network Access (ZTNA) networking connection, and the alternate networking connection is a first alternate networking connection, the method further comprising:

determining, using the STUN server, a second alternate networking connection for the data flow that bypasses the relay node;

determining that the second alternate networking connection is the more optimal path for the data plane traffic than the ZTNA networking connection, the second alternate networking connection being at least one of a proxied networking connection or a proxy and relay networking connection that passes through a different relay node; and based at least in part on the determination that the second alternate networking connection is the more optimal path, causing the data plane traffic to be routed over the second alternate networking connection.

19. The system of claim 11, wherein the initial networking connection is a Zero Trust Network Access (ZTNA) networking connection, and the alternate networking connection is a first alternate networking connection, the operations further comprising:

determining, using the STUN server, a second alternate networking connection for the data flow that bypasses the relay node;

determining that the second alternate networking connection is the more optimal path for the data plane traffic than the ZTNA networking connection, the second alternate networking connection being at least one of a proxied networking connection or a proxy and relay networking connection that passes through a different relay node; and based at least in part on the determination that the second alternate networking connection is the more optimal path, causing the data plane traffic to be routed over the second alternate networking connection.

20. The one or more non-transitory computer-readable media of claim 17, wherein the initial networking connection is a Zero Trust Network Access (ZTNA) networking connection, and the alternate networking connection is a first alternate networking connection, the operations further comprising:

determining, using the STUN server, a second alternate networking connection for the data flow that bypasses the relay node;

determining that the second alternate networking connection is the more optimal path for the data plane traffic than the ZTNA networking connection, the second alternate networking connection being at least one of a proxied networking connection or a proxy and relay networking connection that passes through a different relay node; and based at least in part on the determination that the second alternate networking connection is the more optimal path, causing the data plane traffic to be routed over the second alternate networking connection.

* * * * *